Patented Sept. 13, 1949

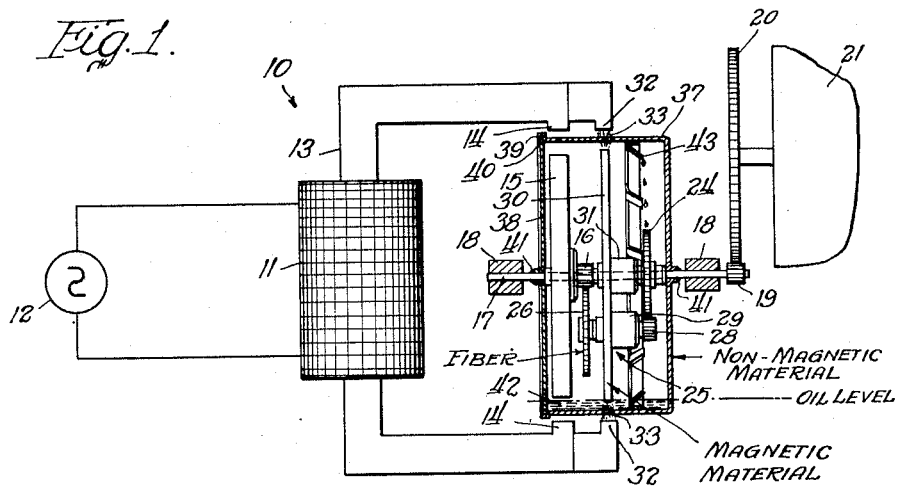

2,482,032

UNITED STATES PATENT OFFICE 2,482,032

ELECTRIC MOTOR CONSTRUCTION

Edmund O. Schweitzer, Jr., Northbrook, Ill.

Application November 28, 1945, Serial No. 631,423

9 Claims. (Cl. 318—15)

My invention relates, generally, to electric motor constructions, and it has particular relation to speed reducing means therefor.

One object of my invention, generally stated, is to provide a speed reduction mechanism for small electric motors, such as synchronous motors used for driving clock mechanisms, time switches and the like, which shall be simple and efficient in operation and which may be readily and economically manufactured and used.

Another object is to avoid the loss of lubricating medium in a motor driven reduction gear train.

Another object is to hermetically seal a motor driven reduction gear train together with a lubricating medium therein.

Still another object is to provide a new and improved motor driven reduction gear train.

A further object is to provide lost motion between the motor and the load driven thereby so arranged as to facilitate starting of the motor under substantially no load conditions.

Still another object is to provide a non-positive or yielding coupling between a motor and a load device driven thereby, and to incorporate the same with a gear reduction mechanism.

Other objects of my invention will, in part, be obvious, and in part appear hereinafter.

My invention, accordingly, is disclosed in the embodiments thereof shown in the accompanying drawing and comprises the features of construction, the combination of elements, and arrangement of parts, which will be exemplified in the constructions hereinafter set forth and the scope of the application of which will be indicated in the appended claims.

For a more complete understanding of the nature and scope of my invention, reference can be had to the following detailed description, taken in connection with the accompanying drawing, in which:

Figure 1 is a view partly diagrammatic, and partly in section, which illustrates a preferred embodiment of my invention in a gear reduction mechanism applied to couple a motor to a load;

Figure 2 is a detail sectional view, on an enlarged scale, of the gear reduction mechanism shown in Figure 1, with certain modifications which will be described hereinafter; and Figure 3 is a view, in end elevation, along the line 3—3 of Figure 2, of a modification of the gear reduction mechanism in which weighted means alone serves to hold the reduction gear train stationary.

Referring now particularly to Figure 1 of the drawing, it will be noted that the reference character 10 designates, generally, an electric motor which may be of the type shown in my Patent No. 2,187,179, issued January 16, 1940. However, it will be understood that other similar types of motors can be employed and that it is unnecessary for the purposes of the present invention that the motor be self-starting. The motor 10 may be provided with an energizing coil 11 that is connected, as illustrated, to a source 12 of alternating current such as a 60-cycle 110-volt source. The coil 11 is mounted on a generally C-shaped magnetic core 13 having pole portions 14 which extend radially inwardly to cooperate with and drive a rotor 15. The rotor 15, shown in Figure 2, may comprise a shell 15a of non-magnetic material and a rim 15b of magnetic material which provides a conventional rotor construction well known to those skilled in the art.

The rotor 15 is arranged to drive a pinion 16. As shown more clearly in Figure 2 of the drawing, the rotor 15 and the pinion 16 are mounted loosely on a shaft 17 so that they are free to rotate relative thereto. The shaft 17 may be mounted on suitable bearings 18 that can be supported by means (not shown). Secured to the shaft 17 is a pinion 19, which constitutes the drive pinion. As shown, the pinion 19 may be arranged to engage a gear wheel 20 that, in turn, drives a suitable load device 21, such as a clock, time switch, or the like.

There is also provided fast on the shaft 17 a gear wheel 24. The provision is made by means of the gear reduction train, shown generally at 25, for operatively interconnecting the pinion 16 and the gear wheel 24. The reduction gear train comprises a gear wheel 26, preferably formed of fiber to reduce noise, that is fast on a shaft 27, and a pinion 28 which is also fast on the shaft 27. While provision is made by the gear train 25 for only two speed reductions, it will be understood that additional speed reductions can be provided for by using additional pinions and gear wheels for effecting the same.

As shown more clearly in Figure 2, the shaft 27 of the gear train 25 is rotatably mounted in a bearing 29 which is mounted on the reduction gearing support 30, preferably in the form of a bar of magnetic material such as steel.

In order to transmit torque from the pinion 16 to the gear wheel 24 through the gear train 25, it is necessary that the support for the gear train be held stationary so as to permit the gear wheel 26 and pinion 28 to turn with respect to the support 30. However, it is desired that there not be a positive connection between the pinion 16 and the gear wheel 24 for the purpose of permitting the rotor 15 to start under conditions which approximate no load. This non-positive connection is also desirable in order to prevent the rotor 15 from falling out of synchronism in the event that there should be change in the frequency of the source 12 or the voltage thereof should dip to an abnormally low point.

Accordingly, the support 30 is carried by bearing 31 which, as shown more clearly in Figure 2, is freely mounted on shaft 17 and is rotatable with respect thereto. The weight of the bearing 29 and of the reduction gearing 25 carried thereby may be sufficient to hold the support 30 substantially stationary in the upright position shown.

The support 30 may also be held stationary by magnetic means. It will be noted that extensions 32 from the pole portions 14 of the core 13 are provided and that they extend radially inwardly toward the support 30, which, as previously stated is formed of magnetic material. Some flux, as indicated at 33, threads through the extensions 32 into the support 30, and the latter is urged thereby to take up a position of minimum reluctance.

It will be apparent that it is possible to employ solely magnetic means for holding the support stationary, or a combination of magnetic means and the weighted construction. As will be set forth hereinafter, it is also possible to employ weighted means only for holding the support stationary.

Now it is desirable to completely enclose the gear reduction train 25 and the parts associated therewith which have been described hereinbefore. Not only is it desirable to completely enclose them, but also it is desirable to house them in a liquid tight casing so as to prevent the evaporation of a lubricating medium provided therein. With such a construction it is possible to run the motor with the enclosed gear train for substantially an indefinite period of time.

As illustrated more clearly in Figures 1 and 2 of the drawing, there is provided a casing 37 for this purpose which is preferably formed of non-magnetic material. The casing 37 completely encloses the rotor 15, the support 30 and gear train 25 carried thereby and the gear wheel 24. The casing 37 includes a cover 38 to facilitate assembly. The cover 38 may be held in place by an inturned lip portion 39 of the casing 35, and the joint may be sealed by suitable means such as solder 40. The casing 37 is fast on the shaft 17 and is secured thereto by suitable means such as solder 41. It will now be apparent that the casing 37 provides a complete liquid-tight seal around the mechanism contained therein.

With a view to lubricating the mechanism within the casing 37, there is provided a small amount of lubricating oil as indicated at 42. This may be a light oil such as used for gear trains of this character. In order to more completely distribute the oil 42, vanes 43 may be provided inside of the casing 37, as shown in Figure 1. The oil 42 is then distributed, as illustrated, on rotation of the casing 37.

It will be understood that the casing 37 rotates with the shaft 17 and that its speed of rotation is substantially less than the speed of rotation of the rotor 15, the degree of reduction depending upon the speed reduction provided by the gear train 25.

In Figure 3 of the drawing there is illustrated a weighted member 46 which is intended to take the place of support 30 for carrying the gear train 25. When reliance is placed principally upon the mass of the support 46 for holding it stationary, it will be understood that it is not essential that it be formed of magnetic material. In such case the pole extensions 32, shown in Figure 1, could be dispensed with.

It will be understood that if the load provided by the device 21 is relatively great, such as requiring substantial static friction to be overcome, the rotor 15 will be permitted to move on energization of the coil 11 even though the shaft 17 may remain momentarily at rest. This is permitted because of the lost motion connection between the pinion 16 and the gear wheel 24 through the gear train 25 that is carried by the movably mounted support 30. In this circumstance the support 30 moves slightly from the normal stationary position, and then resumes the normal position of minimum reluctance or position of minimum potential energy when the load device 21 is driven at the predetermined speed.

Certain further changes can be made in the foregoing constructions, and different embodiments of the invention can be made without departing from the spirit and scope thereof. It is therefore intended that all matter contained in the foregoing description, or shown in the accompanying drawing, shall be interpreted as illustrative and not in a limiting sense.

I claim as my invention:

1. Speed changing and torque limiting means for an electric motor comprising, in combination, motor driving means, a shaft arranged to drive a load device, a gear wheel fast on said shaft, gearing interposed between said driving means and said gear wheel, means rotatably mounted on said shaft for mounting said gearing, and a casing secured to and rotatable with said shaft and enclosing the aforesaid movable mechanism except for the portion of said shaft outside thereof.

2. Speed reducing and torque limiting means for an electric motor comprising, in combination, motor driving means, a shaft arranged to drive a load device, a gear wheel fast on said shaft, reduction gearing interposed between said driving means and said gear wheel, means rotatably mounted on said shaft for mounting said reduction gearing, a casing secured to and rotatable with said shaft and enclosing the aforesaid movable mechanism except for the portion of said shaft outside thereof, and biasing means for holding said mounting means stationary until the torque applied by said shaft to drive said load device exceeds a value determined by the force exerted by said biasing means.

3. Speed reducing and torque limiting means for an electric motor comprising, in combination, a shaft arranged to drive a load device, a rotor rotatably mounted on said shaft, a pinion also rotatably mounted on said shaft and driven by said rotor, a gear wheel fast on said shaft, reduction gearing interposed between said pinion and said gear wheel, and a member rotatably mounted on said shaft for supporting said reduction gearing eccentrically thereof, the mass of said reduction gearing acting to hold said member stationary until the torque applied by said shaft to drive said load device exceeds a value determined by the force exerted by said mass.

4. Speed reducing and torque limiting means for an electric motor comprising, in combination, a shaft arranged to drive a load device, a rotor rotatably mounted on said shaft, a pinion also rotatably mounted on said shaft and driven by said rotor, a gear wheel fast on said shaft, reduction gearing interposed between said pinion and said gear wheel, means rotatably mounted on said shaft for supporting said reduction gearing, and a casing secured to and rotatable with said shaft and enclosing the aforesaid movable mechanism except for the portion of said shaft outside thereof.

5. Speed reducing and torque limiting means for an electric motor comprising, in combination, a shaft arranged to drive a load device, a rotor rotatably mounted on said shaft, a pinion also rotatably mounted on said shaft and driven by said rotor, a gear wheel fast on said shaft, reduction gearing interposed between said pinion and said gear wheel, means rotatably mounted on said shaft for supporting said reduction gearing, and biasing means for preventing rotation of said mounting means on rotation of said shaft until the torque applied thereby to drive said load device exceeds a value determined by the force exerted by said biasing means.

6. In an electric motor construction, in combination, an alternating current stator, a rotor arranged to be driven by said stator, a shaft rotatably mounting said rotor and adapted to drive a load device, a pinion also rotatably mounted on said shaft and driven by said rotor, a gear wheel fast on said shaft, reduction gearing interposed between said pinion and said gear wheel, and a member rotatably mounted on said shaft for supporting said reduction gearing eccentrically thereof, the mass of said reduction gearing acting to hold said member stationary until the torque applied by said shaft to drive said load device exceeds a value determined by the force exerted by said mass.

7. In an electric motor construction, in combination, an alternating current stator, a rotor arranged to be driven by said stator, a shaft rotatably mounting said rotor and adapted to drive a load device, a pinion also rotatably mounted on said shaft and driven by said rotor, a gear wheel fast on said shaft, reduction gearing interposed between said pinion and said gear wheel, magnetic means rotatably mounted on said shaft for supporting said reduction gearing, and pole pieces extending from said stator for cooperating with said magnetic means to hold the same in predetermined position.

8. In an electric motor construction, in combination, an alternating current stator, a rotor arranged to be driven by said stator, a shaft rotatably mounting said rotor and adapted to drive a load device, a pinion also rotatably mounted on said shaft and driven by said rotor, a gear wheel fast on said shaft, reduction gearing interposed between said pinion and said gear wheel, means rotatably mounted on said shaft for supporting said reduction gearing, and a casing secured to and rotatable with said shaft and enclosing the aforesaid movable mechanism except for the portion of said shaft outside thereof.

9. In an electric motor construction, in combination, an alternating current stator, a rotor arranged to be driven by said stator, a shaft rotatably mounting said rotor and adapted to drive a load device, a pinion also rotatably mounted on said shaft and driven by said rotor, a gear wheel fast on said shaft, reduction gearing interposed between said pinion and said gear wheel, magnetic means rotatably mounted on said shaft for supporting said reduction gearing, pole pieces extending from said stator for cooperating with said magnetic means to hold the same in predetermined position, and a casing secured to and rotatable with said shaft and enclosing the aforesaid movable mechanism except for the portion of said shaft outside thereof.

EDMUND O. SCHWEITZER, Jr.

REFERENCES CITED

The following references are of record in the file of this patent:

UNITED STATES PATENTS

| Number | Name | Date |
| --- | --- | --- |
| 1,221,391 | Thullen | Apr. 3, 1917 |
| 1,442,908 | Ripley | Jan. 23, 1923 |
| 2,003,163 | Warren | May 28, 1935 |

FOREIGN PATENTS

| Number | Country | Date |
| --- | --- | --- |
| 386,825 | Great Britain | Jan. 26, 1933 |
| 23,904 | France | Sept. 19, 1921 |
| 748,223 | France | Apr. 10, 1933 |